United States Patent [19]

Varga

[11] Patent Number: 4,861,011

[45] Date of Patent: Aug. 29, 1989

[54] WORKPIECE RECEIVING AND POSITIONING DEVICE FOR MACHINING OPERATIONS

[76] Inventor: Paul Varga, 213 Philadelphia Ave., Salisbury, Md.

[21] Appl. No.: 182,522

[22] Filed: Apr. 18, 1988

[51] Int. Cl.⁴ ............................................. B23Q 3/00
[52] U.S. Cl. .................... 269/99; 269/902; 269/287
[58] Field of Search .................. 269/303, 315, 10, 99, 269/291, 297–301, 303–306, 315–319, 48.1, 287, 900, 902, 99–101

[56] References Cited

U.S. PATENT DOCUMENTS

| | | | |
|---|---|---|---|
| 3,218,059 | 11/1965 | Andrew | 269/902 |
| 3,502,319 | 3/1970 | Kazalias | 269/315 |
| 4,186,916 | 2/1980 | Varga | 269/315 |
| 4,445,678 | 5/1984 | George | 269/900 |

Primary Examiner—Robert C. Watson
Attorney, Agent, or Firm—Hurt, Richardson, Garner, Todd & Cadenhead

[57] ABSTRACT

A workpiece receiving and positioning device is disclosed which, in combination with a clamp member, holds a workpiece in a selected orientation relative to a slotted machine tool table surface or the like for milling or machining the workpiece. The device includes a main body portion, a block portion with opposed side faces extending from the body portion, thereby forming a recess therebetween for receiving the workpiece, and a base portion depending from the body portion and engagable with the slots in the table surface. Fasteners are provided to secure the base portion within the slots, and the clamp member includes a fasteners disposed in opposing relationship with the opposed side faces for holding the workpiece against the opposed side faces.

20 Claims, 4 Drawing Sheets

WORKPIECE RECEIVING AND POSITIONING DEVICE FOR MACHINING OPERATIONS

BACKGROUND OF THE INVENTION

Machining operations normally require that the workpiece being machined be precisely positioned and tightly clamped so that the operation can be performed with the requisite precision. Such operations are often performed with the workpiece secured in place on a machine tool table, such as the table of a milling machine. Tables of this type are normally made with a plurality of grooves milled in the upper surface thereof, into which clamping members are inserted and adjusted to an appropriate position. An example of such a clamping member and a conventional machine tool table are found in my prior U.S. Pat. No. 4,186,916 for a Precision Workpiece Positioning Means For Machine Tools.

While the invention disclosed in my prior patent provides superior positioning and stability for essentially regularly shaped objects a need exists in the art for a means to secure both regularly and irregularly shaped objects in various 90° orientations for milling purposes, for example, drilling, grinding, etc. . . . Since precision milling is often a delicate and demanding operation, and the workpieces themselves often costly and requiring of precise fit, the securing means must be both positive and adaptable.

SUMMARY OF THE INVENTION

It is, thereof, one of the principal objects of the present invention to provide a workpiece receiving and positioning device for machining operations which provides a precise and secure fit for the workpieces along with the requisite stability during the milling operations.

Another object of the present invention is to provide a receiving and positioning device which is adaptable to receive and hold a plurality of regularly and irregularly shaped workpieces and which has a base member that is easily secured to the milling table.

A further object of the present invention is to provide a receiving and positioning device that is easily placed and moved from one position to another and which is durable to provide a long service life.

These and additional objects are attained by the present invention which relates to a workpiece receiving and positioning device for machining operations which includes block means for receiving, positioning and holding workpieces of regular or irregular shape in combination with a clamp means for milling operation on either the X, Y, or Z axis. Workpieces can thus be machined in a plurality of positions and along the length, width and/or depth thereof. The device includes a base portion which is received by the slots of a conventional machining table and an upper, workpiece receiving portion which is designed to accept workpieces of virtually any shape. Clamping means are also provided to secure the workpiece in the said receiving portion and securing means are included for fixing the block member to the table and for securing the workpiece in combination with the clamping means.

While precision fabrication of the present device is required, a number of suitable materials such as steel, aluminum, other metals or plastics may be used for the construction thereof. The device may also be in a plurality of different sizes. Various other objects and advantages of the present invention will become apparent from the following description, with reference to the accompanying drawings.

DETAILED DESCRIPTION OF THE PREFERRED EMBODIMENT

Figure 1:
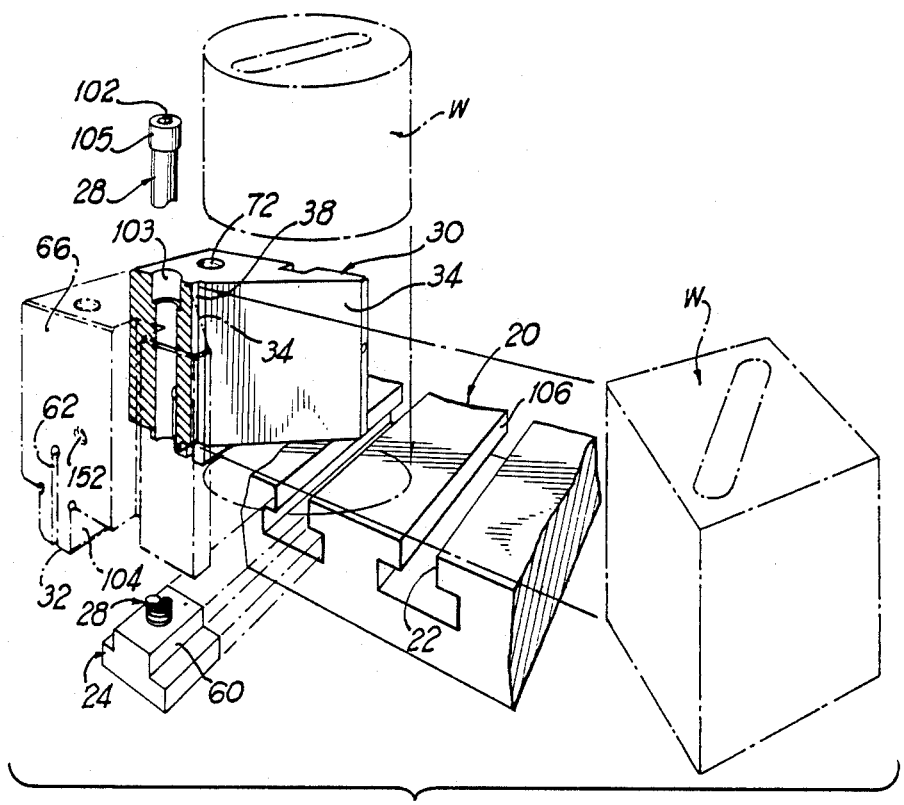
FIG. 1 is an exploded, partial perspective view of the present invention, shown in position for securement to the milling machine table, the device being configured for accepting a workpiece oriented with the Z-axis in vertical relationship to the table for machining in the X, Y or Z axes.

Referring now more specifically to the drawings, and to FIG. 1 in particular, numeral 20 designates generally a portion of a milling machine table, the table normally including a plurality of generally parallel T-shaped slots 22. The slots 22 are designed to receive a T-block or T-nut 24 which has a threaded bore 26 formed therein for receiving a fastener of suitable type, such as bolt 28. This means of centrally fastening the workpiece positioning means to the table, which is to be described hereinbelow, is detailed in my prior U.S. Pat. No. 4,186,916 and pertinent portions thereof are hereby incorporated by reference. Tables of such type may also be disposed vertically as opposed to the horizontal position shown; however, all references to positioning will refer to horizontal orientation.

The first embodiment of the workpiece positioning means is detailed in FIGS. 1 through 5 and is a generally V-shaped block member 30 which may be of variable depth having a main body portion 66 with a base portion 32 projecting radially downwardly from the main body portion for engaging the slots 22 of the table 20. In this embodiment, the apex of the V formed by the opposing side faces 34 is disposed perpendicularly with respect to the table surface. The generally planar side faces 34 of the V-block are thus also perpendicular to the table surface. Thus, as shown in the top plan view of FIG. 4, the workpiece W, with the universal clamp 36 in place, may be held in exactly perpendicular relation to the table for milling on any axis of the workpiece. The three embodiments disclosed all include a main body portion, a base portion depending from the body portion, and a V-block portion integral with the body portion having opposing side walls extending radially away from the main body portion, the only difference in general being the orientation of the side walls with respect to the surface to which the device is secured. The device may be formed by any suitable process, for example, forging, molding, sintering, etc., and tolerances are precisely set.

Figure 2:
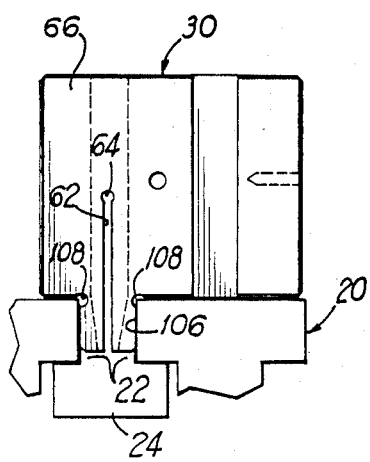
FIG. 2 is a partial side elevational view of the device shown in the preceding figure.
Figure 3:
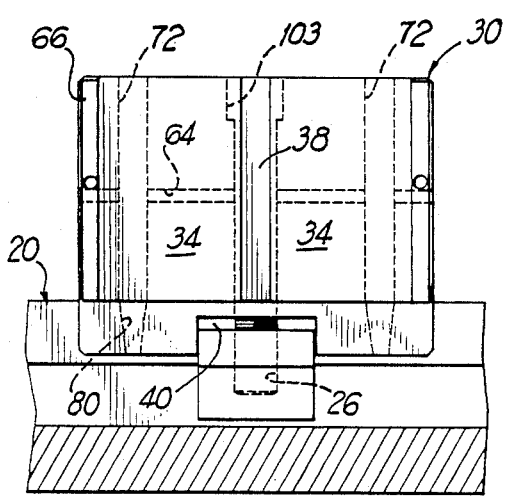
FIG. 3 is a front elevational view of the invention shown in the preceding figures.

The opposing side faces 34 shown in the drawings form a precise 90° angle, although other angular orientations are considered within the scope of the invention, thereby facilitating the securement of rounded, rectangular, and even irregularly shaped workpieces. In this first embodiment, the apex of the V-block includes a cutout portion or groove 38 for accepting corners of rectangular workpieces. The base portion 32 which projects into the slots 22 of the table is centrally recessed at 40, FIG. 3, for a distance sufficient to accept the upwardly extending portion 60 of the T-nut 24. The base portion is also longitudinally divided through its bottom by a laterally centered narrow slot 62 having a relief opening or fillet 64 at the top thereof, as shown in FIGS. 1 and 2, the slot 62 and fillet 64 extending through the entire width of the block member 30. The top of the slot 62, defined by fillet 64 is near the height center of the block member 30.

Figure 5:
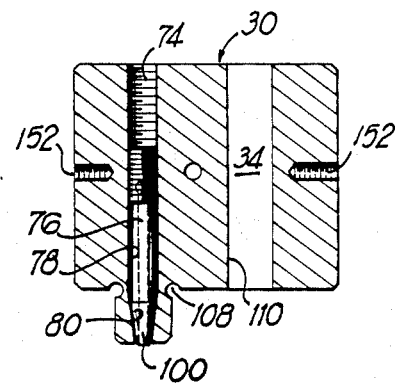
FIG. 5 is a cross-sectional view of the device shown in the preceding figure, the section being taken on line 5—5 of FIG. 4.

Above the base portion 32, the main body portion 66 of block member 30 is provided through its top face 68 with a generally centered bore 70 and right and left side bores 72. The upper portions 74 of bores 70 and 72 are threaded for threadedly receiving suitable screw-type fasteners such as central bolt 28 and side bolts 76. The mid-portions 78 of the bores are unthreaded, as shown in FIGS. 1 and 5 and the side bores include lower tapered bore portions 80, the lower ends of which open through the bottom face of the base portion 32, the opening oriented centrally with regard to slot 62.

Thus, securement of the block member 30 to the table 20 is accomplished through the engaging of bolt 28 with the aforementioned T-nut 24 through bore 70. The side bolts 76 are provided with tapered bottom ends 100 and are received through the side bores 72, the tapered bottom ends 100 extending into the tapered lower bore portions 80. The bolts 28 and 76 have sockets 102 in the heads thereof, configured to receive a wrench, screwdriver, or similar tool to effect turning for threadedly engaging the respective bores.

Downward displacement of bolt 28 draws the body portion 66 into firm engagement with the surface of the table 20, in conjunction with the T-nut 24, a suitable recess 103 being provided at the upper end of bore 70 for receiving the head 105 of bolt 28. Downward displacement of the side bolts 76 and the extension of the tapered bolt ends 100 into the tapered bore portions 80 effects a lateral expansion or spreading of slot 62 and the split halves of the base portion 32, thereby firmly engaging the outer faces 104 of the base portion with the side faces 106 of the table slots 22. Relief openings or fillets 108 are provided at the upper edges of the side faces 104 of base portion 32 for alleviating any stress caused by the said expansion of slot 62 into internal gripping relationship with the table slots 22.

Figure 4:
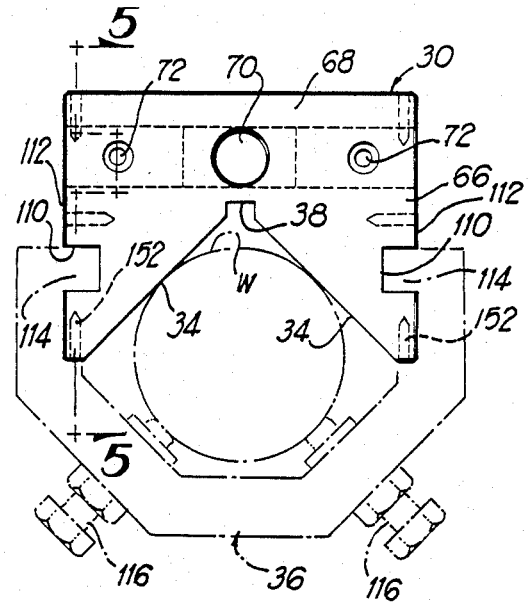
FIG. 4 is a top plan view of the invention shown in FIGS. 1–3, also illustrating in broken lines a workpiece and a conventional, universal clamp usable with the present invention.

With the block member 30 thus secured to the table 20, and referring now in particular to FIG. 4, the workpiece W is positioned against the opposing side faces 34 of the V-block 30. Channel means 110 are provided in the outer side walls 112 of block member 30, in exactly parallel relationship with the side faces 34. The channels 110 extend along the entire width of the walls 112 of block member 30, in generally axial relationship with the horizontal axis of the side walls and are disposed opposite the approximate midlines of side faces 34. The channels 110 extend along the entire width of the walls 112 and are disposed opposite the approximate midpoints of side faces 34. The channels 110 accept the opposed end flanges 114 of clamp member 36 or a similar clamp, clamp member 36 being illustrated as a representative embodiment of a universal C-type clamp. The clamp normally includes lug means 116 disposed through the clamp in perpendicular opposing relationship with the planar side faces 34. The lugs 116 are tightened against the workpiece being machined to secure the workpiece against the opposed faces 34.

While illustrated as generally rectangular, the channels may also be formed as rounded or semicircular, depending on the particular type of clamp used to secure the workpiece W. The extension of the channels 110 along the entire width of outer walls 112 also permits the use of more than one clamp, should this be required for elongated workpieces, since, as previously mentioned, the V-block member may be formed in a plurality of sizes.

Figure 6:
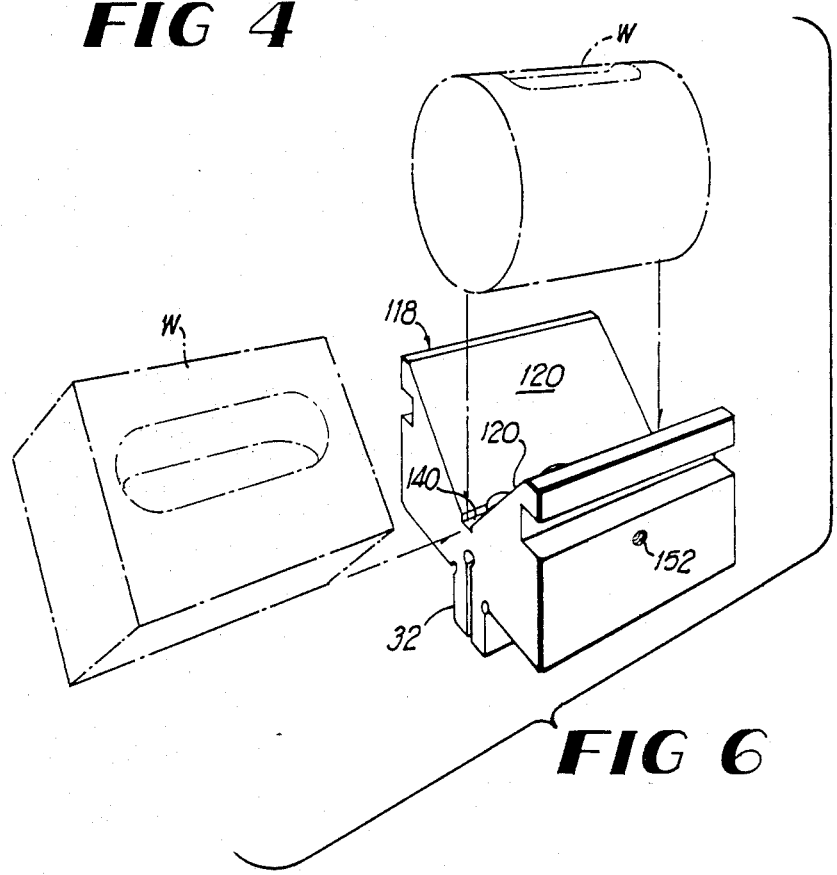
FIG. 6 is a perspective view of an alternate embodiment of the present workpiece accepting and positioning member.
Figure 7:
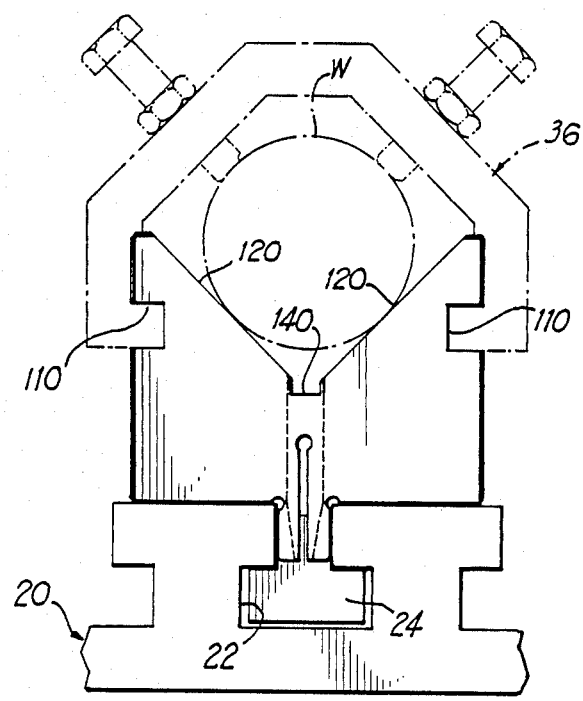
FIG. 7 is an end elevational view of the embodiment shown in the preceding figure.
Figure 8:
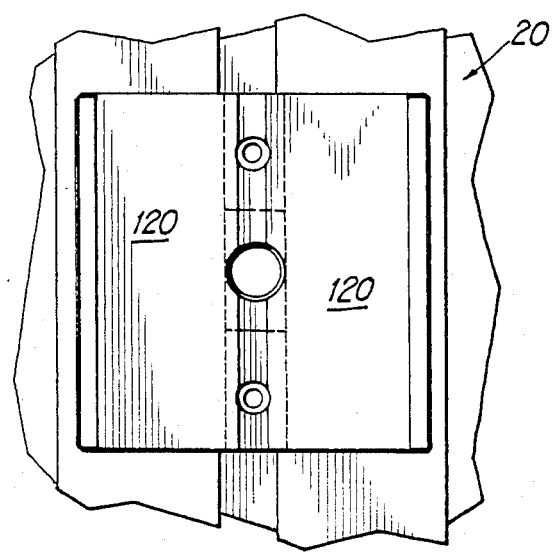
FIG. 8 is a top plan view of the embodiment shown in FIGS. 6 and 7.
Figure 9:
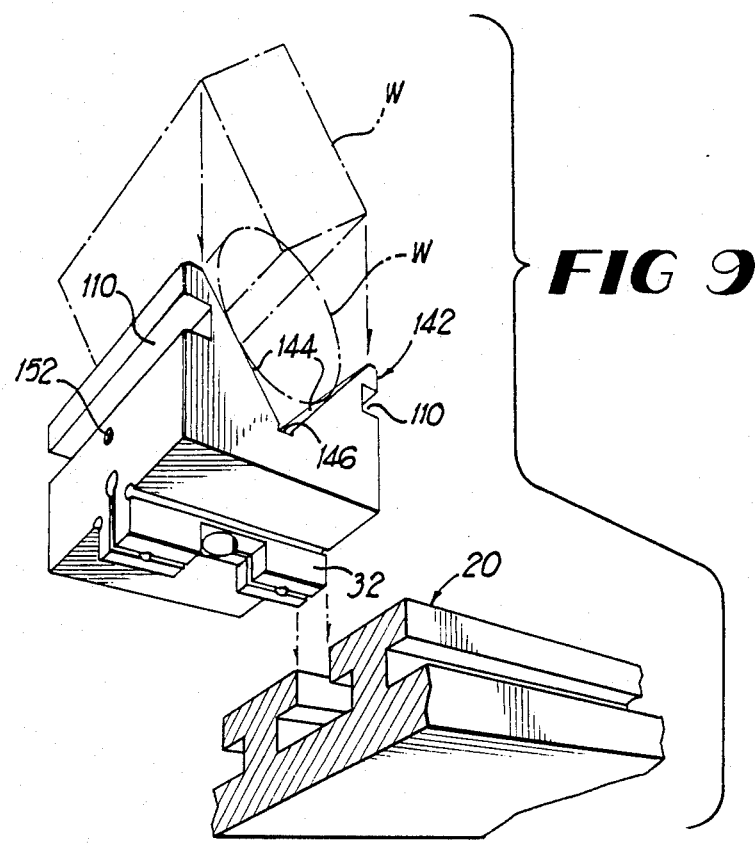
FIG. 9 is a third alternate embodiment of the workpiece accepting and positioning member.
Figure 10:
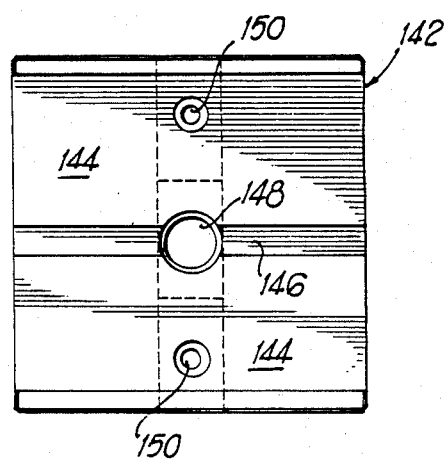
FIG. 10 is a top plan view of the embodiment shown in the preceding figure.
Figure 11:
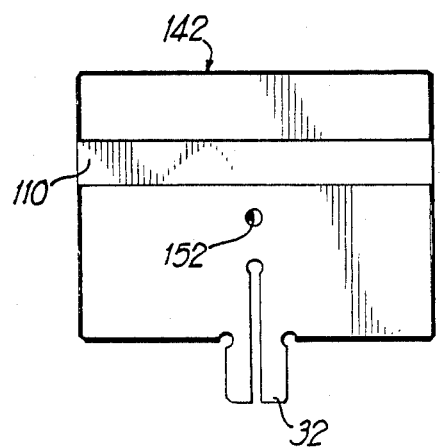
FIG. 11 is an end elevational view of the embodiment shown in FIGS. 9 and 10.

Attention is now directed to FIGS. 6 through 8 which illustrate the second embodiment of the present invention, and to FIGS. 9 through 11, illustrating the third embodiment of the present invention. Similar numerals are used to designate features common to all three embodiments.

FIGS. 6 through 8 illustrate a V-block member 118 in which the apex of the V formed by the opposed planar side faces 120 is disposed in line or axially with the base portion 32, and consequently in line with the slots 22 of table 20, for machining the workpiece on the horizontal X-axis thereof. In this embodiment, the fastening means for securing the block member to the table are disposed through the central groove 140, formed at the apex of the V formed by the side faces 120. The groove 140 is recessed sufficiently to accept the heads of the fastening means and thus provides no obstruction to workpieces positioned on the block member 118. In all other respects, securement of the block member to the table is the same as described hereinabove. With the block member secured, and the workpiece (not shown) in position against side faces 120, a suitable clamp member (not shown) is engaged with the block member, utilizing channels 110, and the lugs in the clamp member are tightened against the workpiece.

In FIGS. 9 through 11, V-block member 142 is illustrated. The opposed planar side faces 144 are oriented such that the apex of the V formed thereby is disposed perpendicularly with respect to the base portion 32 and the slots 22 of the table for machining workpieces on the horizontal Y-axis thereof. The central groove 146, formed at the apex of opposed faces 144, accepts the central fastening bolt therethrough (not shown) for securing the block member 142 to the table, a suitable recess for the head of the bolt being provided as in the embodiment shown in FIGS. 6 through 8. The side bores 150, disposed parallel with the central bore 148, extend through the side faces 144, to engage the 90° reoriented base portion 32.

In all three embodiments, auxiliary threaded bores 152 are provided at various places in the perimeter walls of the block members for attaching auxiliary clamp means or abutment means such as a workpiece stop element (not shown), where required or desirable, as disclosed in my prior U.S. Pat. No. 4,186,916.

Thus, as discussed hereinabove, a precision workpiece positioning means is provided, having a main body portion, a workpiece block portion adjacent or integral with the body portion and having opposed side faces extending radially outwardly from the body portion, and a reduced width base portion depending from the main body portion for engaging the slots of a milling machining table, grinder, etc.

While an embodiment of a workpiece receiving and positioning device for machining operations and modifications thereof have been shown and described in detail herein, various additional changes and modifications may be made without departing from the scope of the invention or the attendant claims.

I claim:

1. A workpiece receiving and positioning device for use in combination with a clamp means for securing and orienting a workpiece relative to the slotted surface of a machine tool table or the like, said clamp means having means for abutting the workpiece, said device comprising a generally rectangular main body portion adapted to rest on said surface, a workpiece receiving block portion adjacent said main body portion with generally opposed inner side faces extending radially outwardly from said main body portion and forming a recess therebetween for receiving a workpiece, a base portion integral with said main body portion and depending downwardly therefrom for engaging a selected slot of said slotted surface of the machine tool table, said base portion having substantially equal halves defined by a slot therebetween, said body portion and said base portion also including at least one bore formed therethrough and having fastening means disposed in said bore for spreading said halves into gripping relationship with said slotted surface.

2. A workpiece receiving and positioning device as defined in claim 1 in which said main body portion and said base portion include a plurality of spaced, generally parallel bores formed therethrough, said bores being screw-threaded throughout part of their length, with a plurality of corresponding fastening means engaged therewith for fixing said base portion in said slot means.

3. A workpiece receiving and positioning device as defined in claim 2 in which said opposed side faces of said block portion are disposed vertically perpendicular relative to said table surface for orienting said workpiece perpendicularly relative to said table surface for machining on the Z-axis thereof.

4. A workpiece receiving and positioning device as defined in claim 3 in which said opposed side faces are generally planar and extend angularly relative to said main body portion and said block means includes a recessed groove extending throughout the width of said block member at the apex of said opposed side faces.

5. A workpiece receiving and positioning device as defined in claim 2 in which said block member includes a recessed groove extending throughout the width thereof at the apex of said opposed side faces, the apex being disposed parallel to the slots of said table surface for orienting the workpiece in parallel relation to the slots for machining on the horizontal X-axis thereof.

6. A workpiece receiving and positioning device as defined in claim 5 in which said bores extend through said groove into said body portion and base portion.

7. A workpiece receiving and positioning device as defined in claim 2 in which said block member includes a recessed groove extending throughout the width thereof at the apex of said opposed side faces, the apex being disposed perpendicular to the slots of said table surface for orienting the workpiece in horizontally perpendicular relation to the slots for machining the workpiece on the horizontal Y-axis thereof.

8. A workpiece receiving and positioning device as defined in claim 7 in which one of said bores is disposed centrally in said groove and extends therethrough into said body portion and said base portion and the other of said bores extend one through each of said opposed side faces into said body portion and base portion.

9. A workpiece receiving and positioning device as defined in claim 1 in which said block portion includes channel means formed in the outer side faces thereof for accepting opposing end flanges of said clamp means.

10. A workpiece receiving and positioning device adapted for engaging the slots formed in machine tool table surface and in combination with a clamp means, for securing and orienting a workpiece relative to said table surface for machining operations, said device comprising a main body portion adapted to rest on said table surface, a workpiece receiving block portion integral with said body portion and having opposed, generally planar inner side faces extending angularly away from said body portion forming an apex at the intersection thereof and forming a recess therebetween for receiving the workpiece, said block portion also including channel means formed in the outer side faces thereof for accepting opposed end flanges of said clamp means, a base portion integral with said main body portion and depending downwardly therefrom for engaging a selected slot of said slotted surface of the machine tool table, said base portion having substantially equal halves defined by a slot therebetween, said body portion and said base portion also including at least one bore formed therethrough and having fastening means disposed in said bore for spreading said halves into gripping relationship with said slotted surface.

11. A workpiece receiving and positioning device as defined in claim 10 in which said main body portion and said base portion include a plurality of spaced, generally parallel bores formed therethrough, said bores being screw-threaded throughout part of their length, with a plurality of corresponding fastening means engaged therewith for fixing said base portion in said slot means.

12. A workpiece receiving and positioning device as defined in claim 11 in which said opposed side faces of said block portion are disposed vertically perpendicular relative to said table surface for orienting said workpiece perpendicularly relative to said table surface for machining on the Z-axis thereof.

13. A workpiece receiving and positioning device as defined in claim 11 in which said block member includes a recessed groove extending throughout the width thereof at the apex of said opposed side faces, the apex being disposed parallel to the slots of said table surface for orienting the workpiece in parallel relation to the slots for machining on the horizontal X-axis thereof.

14. A workpiece receiving and positioning device as defined in claim 13 in which said bores extend through said groove into said body portion and base portion.

15. A workpiece receiving and positioning device as defined in claim 11 in which said block member includes a recessed groove extending throughout the width thereof at the apex of said opposed side faces, the apex being disposed perpendicular to the slots of said table surface for orienting the workpiece in horizontally perpendicular relation to the slots for machining the workpiece on the horizontal Y-axis thereof.

16. A workpiece receiving and positioning device adapted for engaging the slots formed in a machine tool table surface and in combination with a clamp means, for securing and orienting a workpiece relative to said table surface for machining operations, said device comprising a main body portion adapted to rest on said table surface, a workpiece receiving block portion integral with said body portion and having opposed, generally planar inner side faces extending angularly away from said body portion forming an apex at the intersection thereof and forming a recess therebetween for receiving the workpiece, said block portion also including channel means formed in the outer side faced thereof for accepting opposed end flanges of said claim means, a base portion integral with said main body portion and depending downwardly therefrom for engaging a selected slot of said slotted surface of the machine tool table, said base portion having substantially equal halves defined by a slot therebetween, said body portion and said base portion also including at least one bore formed therethrough and having fastening means disposed in said bore for spreading said halves into gripping relationship with said slotted surface, said clamp means having adjustable lugs disposed therethrough in generally perpendicular relationship with said opposed side faces for engaging the sides of the workpiece and holding the workpiece against said opposed sides.

17. A workpiece receiving and positioning device as defined in claim 16 in which said opposed side faces of said block portion are disposed vertically perpendicular relative to said table surface for orienting said workpiece perpendicularly relative to said table surface for machining on the Z-axis thereof.

18. A workpiece receiving and positioning device as defined in claim 16 in which said block member includes a recessed groove extending throughout the width thereof at the apex of said opposed side faces, the apex being disposed parallel to the slots of said table surface for orienting the workpiece in parallel relation to the slots for machining on the horizontal X-axis thereof.

19. A workpiece receiving and positioning device as defined in claim 16 in which said block member includes a recessed groove extending throughout the width thereof at the apex of said opposed side faces, the apex being disposed perpendicular to the slots of said table surface for orienting the workpiece in horizontally perpendicular relation to the slots for machining the workpiece on the horizontal Y-axis thereof.

20. A workpiece receiving and positioning device adapted for engaging the slots formed in machine tool table surface and in combination with a clamp means, for securing and orienting a workpiece relative to said table surface for machining operations, said device comprising a main body portion adapted to rest on said table surface, a worpiece receiving block portion integral with said body portion and having opposed, generally planar inner side faces extending angularly away from said body portion forming an apex at the intersection thereof and forming a recess therebetween for receiving the workpiece, a base portion extending radially from said body portion and having a reduced width relative thereto for engaging a slot in the table surface, said body portion and said base portion including at least one bore formed therethrough and opening into the slot, and a fastening means engaged with said bore for securing said base portions within the slot, said block portion also including a groove formed at the apex of said opposed side faces being of a depth sufficient to receive the edge of a right angular workpiece and to receive said fastening means therein.

* * * * *